US007130371B2

(12) United States Patent
Elyan et al.

(10) Patent No.: US 7,130,371 B2
(45) Date of Patent: Oct. 31, 2006

(54) SYSTEM FOR ALTERNATELY PULSING ENERGY OF ACCELERATED ELECTRONS BOMBARDING A CONVERSION TARGET

(75) Inventors: Vladimir V. Elyan, Moscow (RU); Boris V. Bekhtev, Moscow (RU); Gary F. Bowser, Auburn, IN (US); Boris S. Sychev, Moscow (RU); Vitaly A. Uvarov, Moscow (RU)

(73) Assignee: ScanTech Holdings, LLC, Atlanta, GA (US)

( * ) Notice: Subject to any disclaimer, the term of this patent is extended or adjusted under 35 U.S.C. 154(b) by 12 days.

(21) Appl. No.: 10/529,342

(22) PCT Filed: Sep. 29, 2003

(86) PCT No.: PCT/US03/30499

§ 371 (c)(1), (2), (4) Date: Mar. 25, 2005

(87) PCT Pub. No.: WO2004/030162

PCT Pub. Date: Apr. 8, 2004

(65) Prior Publication Data

US 2006/0050746 A1 Mar. 9, 2006

Related U.S. Application Data

(60) Provisional application No. 60/414,263, filed on Sep. 27, 2002, provisional application No. 60/461,209, filed on Apr. 7, 2003.

(51) Int. Cl.

| | |
|---|---|
| ***G01N 23/04*** | (2006.01) |
| ***H01J 35/00*** | (2006.01) |
| ***H05H 9/00*** | (2006.01) |

(52) U.S. Cl. ........................ 378/57; 378/119; 315/505

(58) Field of Classification Search ................. 378/57, 378/119, 138; 315/500, 505
See application file for complete search history.

(56) References Cited

U.S. PATENT DOCUMENTS

| | | | | |
|---|---|---|---|---|
| 5,608,403 | A * | 3/1997 | Miller | 342/13 |
| 5,666,393 | A * | 9/1997 | Annis | 378/57 |
| 6,151,381 | A * | 11/2000 | Grodzins et al. | 378/90 |
| 6,327,339 | B1 * | 12/2001 | Chung et al. | 378/121 |
| 6,407,505 | B1 * | 6/2002 | Bertsche | 315/5.41 |
| 6,483,163 | B1 * | 11/2002 | Isogai et al. | 257/446 |

* cited by examiner

*Primary Examiner*—Edward J. Glick
*Assistant Examiner*—Irakli Kiknadze
(74) *Attorney, Agent, or Firm*—Coursey & Coursey, P.C.; R. Stevan Coursey

(57) ABSTRACT

A RF linear electron accelerator system for generating a beam of accelerated electrons bunched in pulses having different energy spectra from pulse to pulse. The system is operable to generate a beam of high energy X-rays from such beam of accelerated electrons, using a conversion target, with pulses of the X-ray beam having energy spectra which are different from X-ray pulse to X-ray pulse. Preferably, the pulses of the electron beam have energy spectra which alternate from pulse to pulse and, correspondingly, the pulses of the X-ray beam have energy spectra which alternate from pulse to pulse. Also preferably, the current of electrons injected into the system's accelerating section and the frequency of the pulse RF power supplied to the accelerating section are changed in a synchronized manner to generate the electron beam. The system is employable in an inspection system for discriminating materials present in containers by atomic numbers.

2 Claims, 3 Drawing Sheets

SYSTEM FOR ALTERNATELY PULSING ENERGY OF ACCELERATED ELECTRONS BOMBARDING A CONVERSION TARGET

CROSS REFERENCE TO RELATED APPLICATIONS

This application claims the benefit of priority to U.S. provisional applications Ser. No. 60/414,263 entitled "Method and Apparatus for Alternately Pulsing Energy of Accelerated Electrons Bombarding a Conversion Target," filed on Sep. 27, 2002, and Ser. No. 60/461,209 entitled "Method and Apparatus for Alternately Pulsing Energy of Accelerated Electrons Bombarding a Conversion Target," filed on Apr. 7, 2003.

FIELD OF THE INVENTION

The present invention relates to the field of RF linear electron accelerators for large object inspection systems. More particularly, the present invention relates to the field of RF linear electron accelerators used for the generation of high energy X-ray beams which provide for the discrimination of materials present within large cargo containers.

BACKGROUND OF THE INVENTION

Large object inspection systems using high energy X-ray beams to detect potentially harmful or illegal items (i.e., such as contraband, weapons, illegal drugs, and explosives) include RF linear electron accelerators and conversion targets that transform electron beam energy into a high energy X-ray beam with a single energy spectrum, the parameters of which are determined by the accelerated electron energy. The electrons that are directed at the conversion targets of such inspection systems acquire energy during acceleration in RF fields of the systems' RF linear electron accelerators. Typically, these accelerators provide electrons with 120 mA pulse current acceleration to 9 MeV energy. In the acceleration process, both the energy and current of accelerated electrons are kept constant from pulse to pulse. Unfortunately, the black and white images, representing the contents of a container, that are obtained using such high energy X-ray single spectrum beams do not provide for material discrimination of the container's contents by atomic number.

Therefore, there is a need for RF linear electron accelerators providing accelerated electrons with two energy spectra for use in large object inspection systems that enable the discrimination of materials found in objects present in large cargo containers, and for addressing other related issues.

SUMMARY OF THE INVENTION

Broadly described, the present invention comprises apparatuses and methods for the generation of a beam of accelerated electrons having electron current pulses with energy spectra which are different from pulse to pulse. The present invention further comprises apparatuses and methods for utilizing such a beam of accelerated electrons and a conversion target to generate a high energy X-ray beam having pulses with energy spectra that are different from X-ray pulse to X-ray pulse. Preferably, the electron current pulses of the electron beam have energy spectra which alternate from pulse to pulse thereof and, correspondingly, the pulses of the X-ray beam have energy spectra which alternate from pulse to pulse thereof. Also preferably, the electron beam is generated by changing the current of electrons injected into a traveling wave RF accelerator and the frequency of the pulse RF power supplied thereto in a synchronized manner.

The present invention still further comprises apparatuses and methods (including, but not limited to, those apparatuses and methods of a radiographic inspection system for containers) for discriminating materials by their atomic numbers using the afore-described beam of accelerated electrons and a high energy X-ray beam having spectra alternately changing from electron current pulse to electron current pulse. Preferably, to obtain such a high energy X-ray beam, the beam of accelerated electrons comprises electron current pulses with energies which alternately change from pulse to pulse, such that the energy from pulse to pulse changes, preferably, by a factor of two to three. The resulting high energy X-ray beam has, generally, two different high energy X-ray spectra which are employed to discriminate between materials which may, for example and not limitation, be present in the contents of a cargo container. Such discrimination is possible, at least in part, due to the radiation absorption dependence of the materials' effective atomic numbers (also referred to herein as "Z").

According to an embodiment of the present invention, one apparatus preferably includes an RF linear traveling wave electron accelerator and related devices for changing the amplitude of injected electron current pulses and for simultaneous changing the pulse RF power frequency from pulse to pulse in a synchronized manner. One method preferably includes steps of: generating electron current pulses with controlled parameters; injecting the generated electron current pulses into a traveling wave accelerating structure; generating RF power pulses with controlled parameters; feeding the generated RF power pulses into the traveling wave accelerating structure; according to a pre-determined synchronized method, alternately changing the amplitude of the electron current pulses from pulse to pulse and substantially simultaneously changing the pulse RF power frequency from pulse to pulse.

Various objects, benefits and advantages of the present invention will become apparent upon reading and understanding the present specification when taken in conjunction with the appended drawings.

DETAILED DESCRIPTION OF THE PREFERRED EMBODIMENT

Figure 1:
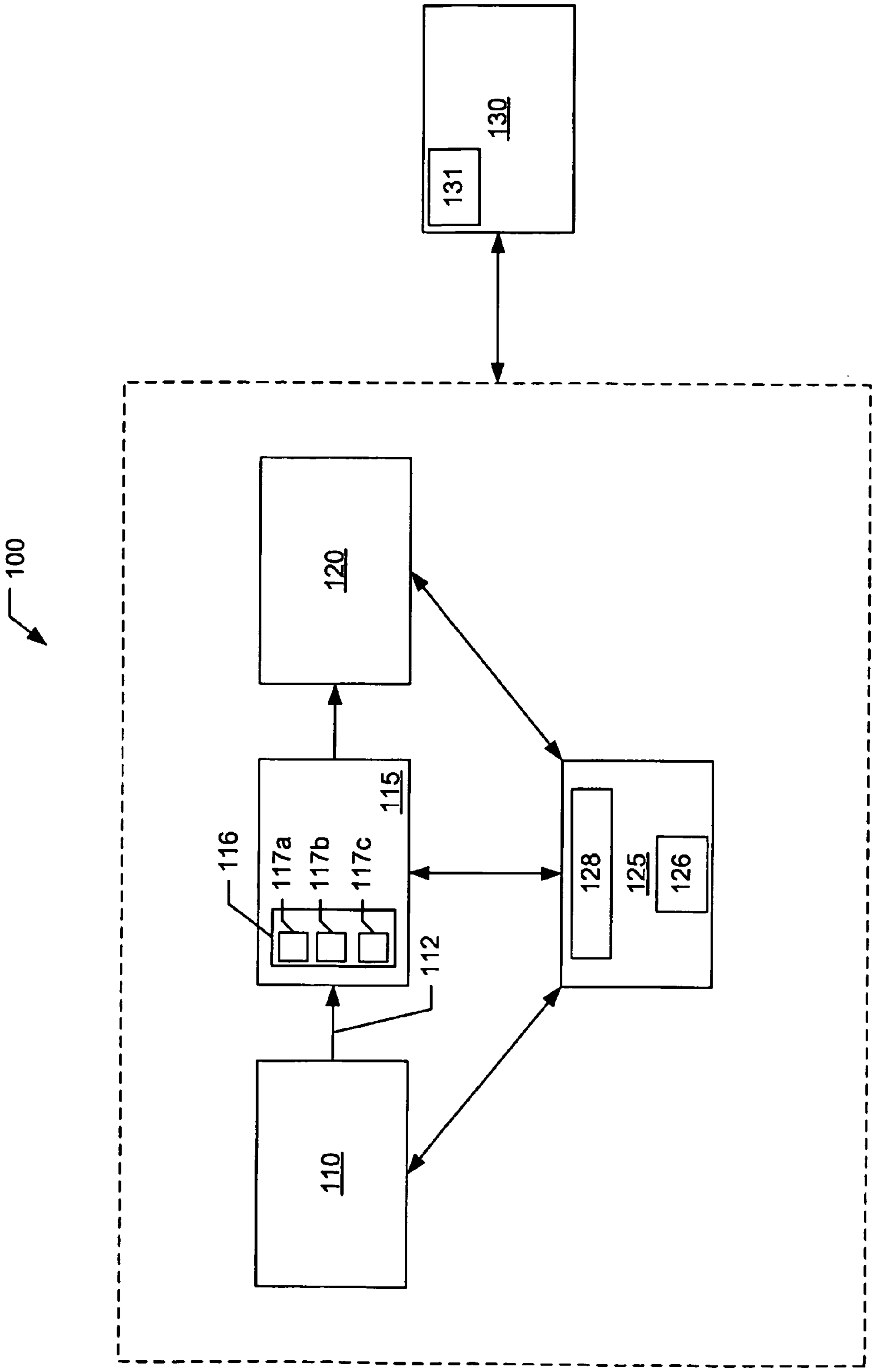
FIG. 1 displays a block diagram representation of a radiographic inspection system and its various subsystems according to an exemplary embodiment of the present invention.

Referring now to the drawings in which like numerals represent like elements or steps throughout the several views, FIG. 1 displays a block diagram representation of a radiographic inspection system 100 and its various subsystems according to an exemplary embodiment of the present invention. Radiographic inspection system 100, which is integrable into a customs inspection facility, comprises a system for inspecting large cargo containers by exposing the containers to a high energy X-ray beam, collecting information resulting from such exposure, processing the collected information to formulate representative images of the objects within the containers, presenting the images of the container's objects to an operator, and identifying the materials of the container's objects by calculating the materials' atomic numbers. The radiographic inspection system 100 includes a radiation subsystem 110, a detection and signal processing subsystem 115, an image generation subsystem 120, and a control subsystem 125.

In the exemplary embodiment of the present invention, the radiographic inspection system 100 is operable with a transportation system 130, such that transportation system 130 moves a cargo container 131 through the radiographic inspection system 100 for inspection. Typically, the transportation system 130 moves a cargo container 131 in a path between the radiation subsystem 110 and the detection and signal processing subsystem 115. For example, and not limitation, the transportation system 130 may include a conveyor pulling a truck having a freight container secured to a flat bed trailer thereof which is carrying a shipment of consumer goods. Additionally, the operation of the transportation system 130 may be controlled via control signals from the control subsystem 125.

The radiation subsystem 110 is communicatively connected to the control subsystem 125 and the detection and signal processing subsystem 115 for communication of data and signals therebetween. The radiation subsystem 110 includes various components (see FIG. 2) used to generate a pulsed electron beam having certain parameters, transform the pulsed electron beam into a high energy X-ray beam 112, and generate a spatial distribution of the high energy X-ray beam 112 (e.g., a fan-shaped beam) by use of a collimator 306. The radiation subsystem 110 is operable for transmitting a spatially distributed high energy X-ray beam 112 to the detection and signal processing subsystem 115. Additionally, the radiation subsystem 110 is adapted to receive control signals from the control subsystem 125 for controlling operation of the radiation subsystem 110.

The detection and signal processing subsystem 115 is communicatively connected to the radiation subsystem 110, the image generation subsystem 120, and the control subsystem 125. The detection and signal processing subsystem 115 includes, but is not limited to, a detector array 116 of detectors 117*a*, 117*b*, 117*c*. Through the detectors 117*a*, 117*b*, 117*c* of the detector array 116, the detection and signal processing subsystem 115 is operable for detecting high energy X-ray beams 112 transmitted by the radiation subsystem 110 which pass through objects in a cargo container 131. One skilled in the art will recognize that a detector array 116 may comprise multiple detectors 117*a*, 117*b*, 117*c* for detecting a high energy X-ray beam 112. Accordingly, the present invention is not limited to only three detectors 117*a*, 117*b*, 117*c* as illustrated in FIG. 1. The detectors 117*a*, 117*b*, 117*c* are adapted to convert detected a high energy X-ray beam 112 into electrical charge distributions. Further, the detection and signal processing subsystem 115 is operable for transforming the electrical charge distributions into digital codes, signals, and/or data and for transmitting digital codes, signals, and/or data to the image generation subsystem 120. Additionally, the detection and signal processing subsystem 115 is adapted to receive control signals from the control subsystem 125 which control operation of the detection and signal processing subsystem 115.

The image generation subsystem 120 is communicatively connected to the detection and signal processing subsystem 115 and the control subsystem 125. The image generation subsystem 120 may include, but is not limited to, hardware and software components necessary for converting digital codes, signals, and/or data into display images. In an exemplary embodiment of the present invention, the image generation subsystem 120 includes a computer system with program modules adapted for generating images from digital data. The image generation subsystem 120 is operable for receiving digital codes, signals, and/or data from the detection and signal processing subsystem 115 and for receiving control signals from the control subsystem 125 which control operation of the image generation subsystem 120. Additionally, the image generation subsystem 120 is adapted to provide data to the control subsystem 125 for displaying an image to an operator and for determining the atomic numbers of the objects of a cargo container 131.

The control subsystem 125 is communicatively connected to the radiation subsystem 110, the detection and signal processing subsystem 115, and the image generation subsystem 120. The control subsystem 125 is operable to generate control signals which control the generation of a high energy X-ray beam 112, the detection and processing of a high energy X-ray beam 112, and the generation of images from digital codes, signals, and/or data. Also, the control subsystem 125 is adapted to provide the control signals to the radiation subsystem 110, detection and signal processing subsystem 115, and the image generation subsystem 120. The control subsystem 125 includes, but is not limited to, an operation program 128 and a computer system 126. The operation program 128 includes program modules or routines configured for controlling high energy X-ray beam 112 generation, signal detection and processing, and image generation. One skilled in the art will recognize that a computer system 126 typically comprises hardware and software for storing, generating, and processing data. The computer system 126 may include, but is not limited to, a processor, volatile and non-volatile memory, user input devices (i.e., a keyboard and mouse), a display (i.e., a computer monitor), an operating system for program, file, and data management, and various software applications for multiple functionalities. The control subsystem 125 provides a user interface to an operator for monitoring and controlling the radiographic inspection system 100. Further, the control subsystem 125 is adapted to receive image data from the image generation subsystem 120 for displaying images on a display for an operator. In the exemplary embodiment of the present invention, the control subsystem 125 is still further adapted to provide control signals to the transportation subsystem 130 to control the movement of a cargo container 131 through the radiographic inspection system 100.

In operation, the radiation subsystem 110 generates a high energy X-ray beam 112 having two energy spectra and directs the high energy X-ray beam 112 toward the detection and signal processing subsystem 115. Preferably, the transportation subsystem 130 moves a cargo container 131 through at least a portion of the radiographic inspection system 100, such that the cargo container 131 passes between such portion(s) of the radiation subsystem 110 and at least a portion of the detection and signal processing subsystem 115. As the transportation subsystem 130 moves the cargo container 131 therebetween, the high energy X-ray beam 112 produced by the radiation subsystem 110 travels through the cargo container 131.

The detection and signal processing subsystem 115 detects radiation that passes through the cargo container 131 with a detector array 116. For each pulse of the high energy X-ray beam 112 generated by the radiation subsystem 110, detectors 117*a*, 117*b*, 117*c* of the detector array 116 transform the received X-ray distribution into an electrical charge distribution. Then, the detection and signal processing subsystem 115 transforms the electrical charge distribution into digital codes, signals, and/or data that are transmitted to the image generation subsystem 120.

The image generation subsystem 120 uses the digital codes, signals, and/or data received from the detection and signal processing subsystem 115 to create an image representing the objects in the cargo container 131 and to discriminate the materials of the objects within the cargo container 131. The image generation subsystem 120 provides the created image and data to the control subsystem 125 for display to an operator. Typically, the image is displayed on a display device such as, but not limited to, a computer monitor.

The control subsystem 125 enables an operator to control the radiographic inspection system 100. Through the control subsystem 125, an operator may activate the radiation subsystem 110 and detection and signal processing subsystem 115 and view the resulting image from the image generation subsystem 120. Generally, the control subsystem 125 includes a computer workstation 126 (with display device) operable to control the radiation subsystem 110, the detection and signal processing subsystem 115, and the image generation subsystem 120.

Figure 2:
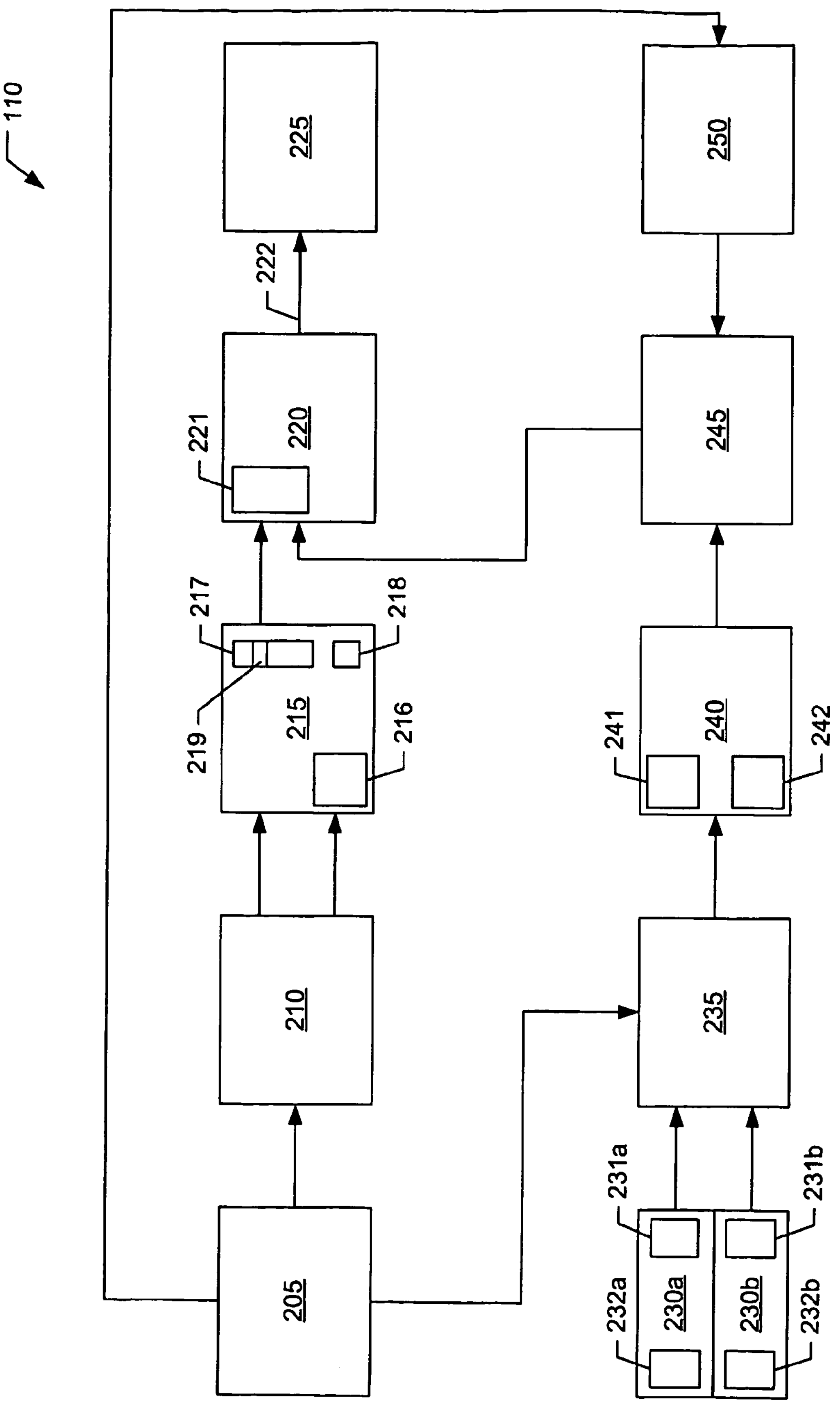
FIG. 2 displays a block diagram representation of the radiation subsystem of FIG. 1 in accordance with the exemplary embodiment of the present invention.

FIG. 2 displays the radiation subsystem 110 of FIG. 1 in accordance with the exemplary embodiment of the present invention. To properly discriminate materials by their atomic numbers, the radiation subsystem 110, typically, generates a beam of accelerated electrons 222 having electron current pulses with energy spectra which alternatively change from pulse to pulse. The radiation subsystem 110 utilizes such a beam of accelerated electrons 222 to generate a pulsed high energy X-ray beam 112 having at least two energy spectra alternatively changing from X-ray pulse to X-ray pulse. To facilitate discrimination, the radiation subsystem 110 includes an injector modulator 210, an injector 215, master generators 230*a*, 230*b* with frequency synthesizers 231*a*, 231*b*, a commutator 235, an exciter 240, an amplifier 245, an amplifier modulator 250, an accelerating section 220, a conversion target 225, and a synchronizer 205.

The injector modulator 210 communicatively connects to the synchronizer 205 and the injector 215. The injector modulator 210 is adapted to receive a signal from the synchronizer 205 and, based on the signal, provide high and low voltage pulses to the injector 215. The voltage pulses generated by the injector modulator 210 vary by amplitude, but, preferably the voltage pulses have amplitudes of V1 and V2. The injector modulator 210 simultaneously provides the injector 215 with a high and a low voltage pulse when directed by the synchronizer 205. The two arrows extending from the injector modulator 210 to the injector 215, illustrated in FIG. 2, represent the simultaneous transmissions of a high voltage pulse with amplitude V1 and a low voltage pulse with amplitude V2.

The injector 215 communicatively connects to the injector modulator 210 and the accelerating section 220. The injector 215 includes, but is not limited to, a control electrode 216, a cathode-grid unit 217, a cathode-grid gap 219, and an anode 218. In the exemplary embodiment of the present invention, the injector 215 comprises a three-electrode injector (i.e., with one electrode designated as the control electrode 216) and, more specifically, a triode-type electron gun for altering the current of an electron beam. The control electrode 216, and thus the injector 215, is operable for receiving a low voltage pulse from the injector modulator 210 and providing the low voltage pulse to the cathode-grid gap 219. Accordingly, the cathode-grid gap 219 is adapted to receive the low voltage pulse from the control electrode 216. The cathode-grid unit 217, generally, comprises the cathode-grid gap 219 and is located proximate the anode 218. The cathode-grid unit 217, and thus the injector 215, is operable for receiving the high voltage pulse from the injector modulator 210. Further, the cathode-grid unit 217 and the cathode-grid gap 219 are operable to combine the high voltage pulse and low voltage pulse into an electron beam characterized by its injection current amplitude (I). The injector 215 is further adapted to provide the generated electron beam to the accelerating section 220.

The two master generators 230*a*, 230*b* are communicatively connected to the commutator 235. Each master generator 230*a*, 230*b* includes, but is not limited to, a frequency synthesizer 231*a*, 231*b* and a phase detector 232*a*, 232*b*. Each master generator 230*a*, 230*b* is operable to produce pulses of RF waves having a specific frequency (F1 or F2), and, more preferably, the first master generator 231*a* produces pulses of RF waves having a frequency F1 and the second master generator 231*b* produces pulses of RF waves having a frequency F2. The phase detectors 232*a*, 232*b* operate to compare the frequency of the pulse RF waves produced by the master generator 230*a*, 230*b* with the frequencies produced by a stabilized quartz generator (not shown). The phase detectors 232*a*, 232*b* are adapted to produce error signals which are used to correct the frequency of the pulse RF waves produced by the master generators 230*a*, 230*b*. The frequency synthesizers 231*a*, 231*b* operate to regulate the frequency produced by the master generators 230*a*, 230*b* to ensure a frequency of either F1 or F2. Further, the master generators 230*a*, 230*b* are adapted to provide the generated pulses of RF waves having frequency F1 or F2 to the commutator 235. As illustrated in FIG. 2, the two arrows between the master generators 230*a*, 230*b* and the commutator 235 indicate that pulses of RF waves having frequency F1 and pulses of RF waves having frequency F2 are simultaneously provided to the commutator 235 from the master generators 230*a*, 230*b*.

The commutator 235 communicatively connects with the master generators 230*a*, 230*b*, the synchronizer 205, and the exciter 240. The commutator 235 is adapted to receive multiple streams of pulses of RF waves with varying frequencies from the master generators 230*a*, 230*b*; to provide a single stream of pulses of RF waves having frequency F1 or F2 to the exciter 240; and to receive control signals from the synchronizer identifying which stream of pulses of RF waves to provide to the exciter 240 and when to provide the identified stream of pulses of RF waves to the exciter 240.

The exciter 240 communicatively connects to the commutator 235 and the amplifer 245. The exciter 240 is operable to receive a stream of pulses of RF waves having a specific frequency (F1 or F2) from the commutator 235; to intensify (i.e., by multiplying) the received pulses of RF waves' frequency by a pre-determined amount; and to provide the intensified pulses of RF waves, with an appropriate magnitude, to the amplifier 245. The exciter 240, typically, includes, but is not limited to, a frequency multiplier 241 and a pre-amplifier 242. The frequency multiplier 241 and pre-amplifier 242 assist in intensifying the received pulses of RF waves' frequency to a desired frequency.

The amplifier 245 communicatively connects to the exciter 240, the accelerating section 220, and the amplifier modulator 245. The amplifier 245 is adapted to receive intensified pulses of RF waves from the exciter 240; to amplify the received pulses of RF waves; to provide the amplified pulses of RF waves to the accelerating section 220 of the electron accelerator; and to receive a control signal from the amplifier modulator 245 indicating, at least, when to provide the amplified pulses of RF waves to the accelerating section 220 of the electron accelerator.

The amplifier modulator 250 communicatively connects to the amplifier 245 and the synchronizer 205. The amplifier modulator 250 is operable to provide control signals to the amplifier 245, indicating when it should provide the amplified pulses of RF waves to the accelerating section 220; to receive control signals from the synchronizer 205, indicating when it should provide a control signal to the amplifier 245; and to regulate the amplification of the pulses of RF waves by the amplifier 245. The amplifier modulator 250 ensures that the pulses of RF waves are amplified to a pre-determined level by the amplifier 245.

The accelerating section 220 (i.e., also known as the "traveling wave accelerating section") of the electron accelerator communicatively connects to the injector 215 thereof, and to the amplifier 245. The accelerating section 220 includes, but is not limited to, an iris-loaded waveguide 221 adapted to: receive an electron beam characterized by its injection current amplitude (I) from the injector 215; receive the pulse RF power from the amplifier 245; and accelerate and shape the electron beam received from the injector 215 with the pulse RF power received from the amplifier 245. More specifically, the iris-loaded waveguide 221 is adapted to increase and decrease pulse RF wave phase velocity depending on the increase or decrease of accelerating voltage frequency. The iris-loaded waveguide 221 implements an inverse relationship between the pulse RF wave phase velocity and the accelerating voltage frequency. Accordingly, as voltage frequency acceleration decreases, the iris-loaded waveguide 221 increases the pulse RF wave phase velocity. Similarly, as voltage frequency acceleration increases, the iris-loaded waveguide 221 decreases the pulse RF wave phase velocity. As illustrated in FIG. 2, the two arrows (one arrow from the injector 215 and one arrow from the amplifier 245) indicate that the accelerating section 220 receives the electron beam and pulse RF power simultaneously. Further, the accelerating section 220 is adapted to bombard the conversion target 225 with pulses of accelerated electrons 222 having at least two different energy spectra.

The conversion target 225 is operable to receive pulses of accelerated electrons 222 from the accelerating section 220; to convert the accelerated electrons 222 into a beam of bremsstrahlung 112 corresponding to the at least two energy spectra of the electron current pulses 222; and to direct the generated high energy X-ray beam 112 toward a predetermined location. For example and not limitation, the conversion target 225 may direct the beam of high energy X-ray pulses 112 at a cargo container 131 for material discrimination. In one embodiment of the present invention, the conversion target 225 is made of tungsten, which assists in the generation of bremsstrahlung 112 from accelerated electrons 222.

The synchronizer 205 communicatively connects to the injector modulator 210, the commutator 235, and the amplifier modulator 250. To ensure proper generation of high energy X-ray beam 112 pulses, the synchronizer 205 is adapted to provide control signals to the injector modulator 210 for indicating whether to send a low voltage pulse (and indicating when to send the low voltage pulse to the injector 215, thus indirectly controlling when the injector 215 sends an injected electron beam to the accelerating section 220); to provide control signals to the commutator 235 for indicating when it should send the pulses of RF waves having frequency F1 or F2 to the exciter 240; and to provide control signals to the amplifier modulator 250 for indicating when it should instruct the amplifier 245 to send the amplified pulses of RF waves to the accelerating section 220. In the exemplary embodiment of the present invention, the synchronizer 205 is further adapted to receive control signals from the control subsystem 125 (see FIG. 1). The control subsystem 125 may regulate the generation of various energy beams through the synchronizer 205.

In operation, the injector modulator 210 is activated by the synchronizer 205, which synchronizes the operation of the injector modulator 210 and the amplifier modulator 250. The injector modulator 210 provides high voltage pulses to the injector 215 (i.e., a three-electrode injector) and low voltage pulses to the injector's 215 control electrode 216 which are used to control the injection current. The injector modulator 210 provides low voltage pulses to the injector's 215 control electrode 126 according to a predetermined method of operation.

In the exemplary embodiment of the present invention, the three-electrode injector 215 is, preferably, a triode-type electron gun that enables changing of the current of an electron beam. The high voltage pulse received from the injector modulator 210 is provided to a cathode-grid unit 217, relative to an anode 218. As described more fully below, an electron beam is accelerated and shaped by the high voltage pulse for further acceleration in an iris-loaded waveguide 221. The low voltage pulse received from the injector modulator 210 is provided to the cathode-grid gap 219 (i.e., associated with the cathode-grid unit 217) where, in accordance with amplitude V1 or V2, an electron beam having appropriate injection current amplitude, I, is generated.

Under the control of the synchronizer 205, the injector modulator 210 and the amplifier 245 (preferably, a klystron), in combination with the master generators 230*a*, 230*b* and commutator 235, generate the two pairs of injector control electrode voltages (V1 and V2) and accelerator pulse RF power frequencies (F1 and F2), in accordance with the pre-determined method of operation. When voltage V1 and frequency F1 are generated, electrons having reduced injection current, I1, are injected by the injector 215 into the accelerating section 220 with a maximal electromagnetic wave phase velocity. Subsequently, the electrons are accelerated within the accelerating section 220 to a maximal energy level of 10 MeV. When voltage V2 and frequency F2 are generated, the injection current of the electrons increases several-fold, resulting in a reduction in the accelerating voltage. Due to the increase in pulse RF power frequency, the electromagnetic wave phase velocity is reduced and, as a consequence, there is a corresponding reduction in the electron energy level within the accelerating section 220.

Collectively, the master generators 230*a*, 230*b* with frequency synthesizers 231*a*, 231*b* and the commutator 235 are sometimes referred to herein as the klystron frequency control system. The klystron frequency control system provides for the change in the klystron excitation frequency, F, which is required for the radiation subsystem 110 to operate in dual energy mode. Each of the two master generators 230*a*, 230*b* operates at a different frequency (F1 or F2). Stability for each master generator frequency is provided by tying each master generator frequency to the frequency of a stabilized quartz generator (not shown). To increase accuracy, digital counters are used to reduce the master generator frequency and the quartz generator frequency (i.e., the frequencies are lowered to 200 Hz). The resulting frequencies are then compared in phase detectors 232*a*, 232*b*. An error signal may be generated by the phase detectors 232_a_, 232_b_ during comparison of the reduced master generator frequency and the reduced quartz generator frequency. If so, the error signal is transmitted to the master generator 230_a_, 230_b_ so that the master generator frequency may be corrected and/or stabilized by the frequency synthesizers 231_a_, 231_b_. Typically, each master generator 230_a_, 230_b_ operates at a frequency that corresponds to electron energy acceleration of 3 MeV or 10 MeV.

The master generators 230_a_, 230_b_ produce pulses of RF waves having differing frequencies that are provided simultaneously to the commutator 235. The commutator 235 is controlled by the synchronizer 205 which provides a synchronizing control signal to the commutator 235. After receiving the synchronizing control signal from the synchronizer 205, the commutator 235, according to a pre-determined method of operation, transmits pulses of RF waves having either frequency F1 or frequency F2 to the exciter 240.

The exciter 240, through a frequency multiplier 241, multiplies the frequency of the received pulses of RF waves by a pre-determined amount (i.e., by fifty) to produce the accelerator operating frequency. For example and not limitation, if the received pulses of RF waves' frequency falls between 57.1 MHz and 57.3 MHz, then the resulting accelerator operating frequency might be approximately 2,860 MHz after multiplication. The exciter 240, through a pre-amplifier 242, then amplifies the incoming power by a pre-determined amount (i.e., by 10 to 15 dB), thus resulting in the power magnitude required for klystron excitation. The exciter 240 then provides the amplified pulses of RF power, having the F1 or F2 frequency, to the amplifier 245. Upon amplifying the pulses of RF power under the direction of the amplifier modulator 250, the amplifier 245 provides the further amplified pulses of RF power or waves to the accelerating section 220.

The amplifier 245 provides the pulses of RF power, originally produced by the master generators 230_a_, 230_b_, to the iris-loaded waveguide 221 of the accelerating section 220. Simultaneously, the injector 215 provides pre-accelerated electrons, bunched into pulses, to the initial part of the iris-loaded waveguide 221. The injected electron velocity is significantly slower than the speed of light and is approximately equal to the phase velocity of the pulses of RF waves currently propagating in the iris-loaded waveguide 221. As the pre-accelerated electrons interact with the pulses of RF waves, the electrons are further accelerated and simultaneously grouped into separate electron bunches. During acceleration, the electron velocity increases and approaches the speed of light. The cell dimensions of the iris-loaded waveguide 221 are configured such that the electromagnetic wave phase velocity increases as electron velocity increases. For effective acceleration, the pulses of RF waves' velocity should be equal to the electron velocity at any given point within the accelerating section 220.

The iris-loaded waveguide 221 is adapted to decrease electromagnetic wave phase velocity when accelerating voltage frequency increases. Additionally, the iris-loaded waveguide 221 is adapted to increase electromagnetic wave phase velocity when the accelerating voltage frequency decreases. Therefore, the iris-loaded waveguide 221 maintains the relationship between the wave phase velocity and the electron velocity from pulse to pulse.

Chart 1 illustrates accelerated electron energy dependence calculated over varying energy beam 222 currents and pulse RF power frequencies. An increase in accelerated electron current from 100 mA to 500 mA results in only a 25% reduction in electron output energy. To reduce the linear accelerator output of electron energy from 10 MeV to 3 MeV, the pulse RF power frequency F (i.e., F1=2,860 MHz) need only be increased by 0.95 MHz while simultaneously increasing the accelerated electron current from 100 mA to 300 mA.

Chart 1

The accelerating section 220 bombards the conversion target 225 with repeated electron current pulse bunches (i.e., beam of accelerated electrons 222). Each pulse bunch includes one electron current pulse with maximum electron energy ($E_{max}$) and current I1 and at least one electron current pulse with minimum electron energy ($E_{min}$) and current I2. Additional electron current pulses (with electron energy not equal to $E_{min}$ and current not equal to I2) may be included in the pulse bunch. The corresponding injector 215 voltage V and pulse RF power frequency F are V1 and F1 or V2 and F2, depending on which of the two accelerated electron current pulses of the pulse bunch is required by the synchronizer 205 at a specific moment.

The electron beam pulses 222 provided by the injector 215 and accelerated in the accelerating section 220 bombard the conversion target 225 with beams of accelerated electrons 222 from pulse to pulse. In response, the conversion target 225 produces high energy X-ray (or bremsstrahlung) beam 112 pulses which are shaped into a fan-shaped beam by a collimator 306. The high energy X-ray beam 112 pulses penetrate through, for example and not limitation, a cargo container 131 and hit the detector array 116.

The resulting high energy X-ray beam 112 has, generally, two different high energy X-ray spectra which are employed to discriminate between materials which may, for example and not limitation, be present in the objects of a cargo container 131. Such discrimination is possible, at least in part, due to the radiation absorption dependence of the materials' effective atomic numbers (also referred to herein as "Z").

The present invention provides for a dual energy inspection mode through the use of a high energy X-ray beam 112 having two different energy spectra which are employed to discriminate between materials found in a target cargo container 131. The difference between the intensity attenuation of the two different energy spectra depends on the atomic number and thickness of the materials within the target cargo container 131 being scanned. As the difference between the intensity attenuation of the two different energy spectra increases, so does the difference between the energy parameters of the high energy X-ray spectra. Accordingly, the information capacity of the dual energy system can be assessed by calculating the difference between normalized signals, through registration of the radiation that has passed through the materials within the target cargo container 131.

For example and not limitation, Chart 2 illustrates, through a theoretical simulation, the normalized responses of detectors produced when scanning different materials, including carbon (C, Z=6), aluminum (Al, Z=13), iron (Fe, Z=26), and lead (Pb, Z=82). Chart 2 illustrates normalized responses at two electron energy levels, with U1 denoting a normalized response at an electron energy level of 10 MeV and U2 denoting a normalized response at an electron energy level of 3 MeV. Normalization of the detector response is performed in the absence of the inspected material. Using the data represented in Chart 2, the requirements for signal processing stability and noise parameters are formulated.

Signal processing stability and noise parameters are used to determine the Z resolution of the material.

Chart 2

To complete the analysis of a container's materials within one pulsed-beam scan of the entire cargo container 131, the energy spectra of the high energy X-ray beam 112 is rapidly changed from X-ray pulse to X-ray pulse and a significant difference between energy spectra parameters is maintained. Typical single energy inspection systems scan one cargo container 131 in approximately thirty seconds at a scanning frequency of 100 Hz to 350 Hz. To maintain the same radiographic inspection system throughput using the dual energy mode scanning of the present invention, the frequency must be in the same range as the repetition rate. Therefore, the change in radiation spectra must occur at substantially the same rate as the scanning frequency.

To provide proper discrimination of cargo materials, the present invention bombards the conversion target 225 with alternating intensities of electron energy 222 from pulse to pulse. According to a pre-determined method of operation, the present invention, generally, provides sequences of pulse pairs with a maximum electron energy of 10 MeV ($E_{max}$) and a minimum electron energy of 3 MeV ($E_{min}$). From pulse to pulse, the commutator 235 alternates between providing a pulse RF accelerating voltage frequency of F1 ($F_{min}$) and a pulse RF accelerating voltage frequency of F2 ($F_{max}$). The shift from $F_{min}$ to $F_{max}$ or $F_{max}$ to $F_{min}$ changes the equilibrium phase of electron acceleration within the accelerating section 220. Additionally, from pulse to pulse, the injector modulator 210 alternates between providing a voltage pulse of amplitude V1 and V2, which alternates the injection current from I1 to I2 that is provided to the accelerating section 220 by the injector 215. The change in the injection current (I) causes a change in the accelerating field intensity.

The sensitivity of material discrimination is directly related to the energy level of the electrons. Generally, a higher level of electron energy results in more accurate material discrimination, as the electron energy guarantees that the radiation has passed through the object. Unfortunately, a decrease in electron energy, used to scan a target material, results in a decrease of the exposition dose of high X-ray energy (resulting in poor sensitivity of material discrimination). The present invention, however, compensates for the electron energy decrease by accompanying the electron energy decrease with a pulse current increase from I1 at $E_{max}$, to I2 at $E_{min}$ Such an accelerated electron current increase offsets the decrease in the exposition dose of high X-ray energy and results in better sensitivity of material discrimination.

Chart 3 illustrates an electron current pulse timing diagram in accordance with the exemplary embodiment of the present invention. To ensure rapid changes in electron energy and current from pulse to pulse, the time between changes cannot be greater than half of the pulse sequence period. The most direct method of changing the electron current outputted by the accelerator 110 is to change the injection current.

Chart 3

Figure 3:
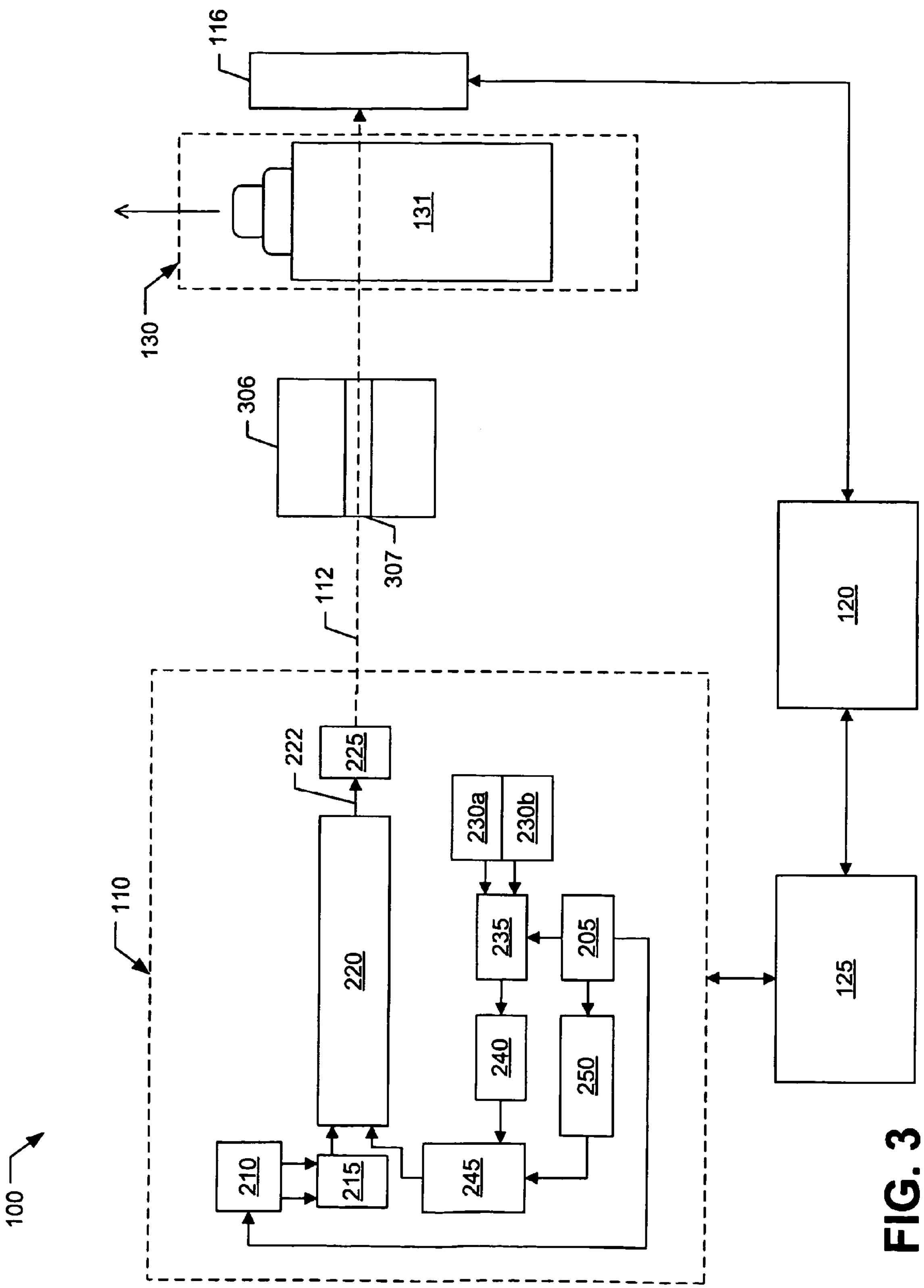
FIG. 3 is a plan view block diagram representation of a radiographic inspection system in accordance with the exemplary embodiment of the present invention.

FIG. 3 is a plan view block diagram representation of a radiographic inspection system 100 in accordance with the exemplary embodiment of the present invention. The radiographic inspection system 100 discriminates materials by their atomic numbers using a pulsed high-energy X-ray beam 112 having pulses with at least two energy spectra. The radiographic inspection system 100, as illustrated in FIG. 3, includes a radiation subsystem 110 (described above with reference to FIG. 2), a collimator 306, a high energy X-ray beam 112 with multiple energy spectra, a transportation system 130, a detector array 116, an image generation subsystem 120, and a control subsystem 125.

The radiation subsystem 110, as described above, communicatively connects to the control subsystem 125 and is proximate to the collimator 306. The radiation subsystem 110 comprises various components (discussed in more detail above with reference to FIG. 2) adapted to generate and transmit a high energy X-ray beam 112 with multiple energy spectra and receive control signals from the control subsystem 125 for controlling the operation of the radiation subsystem 110. Additionally, the radiation subsystem 110 is operable for transmitting the high energy X-ray beam 112 with multiple energy spectra directly at the collimator 306, so that the high energy X-ray beam 112 with multiple energy spectra is shaped, preferably, into a fan-shaped beam lying in a vertical plane relative to the ground.

The collimator 306 is interposed between the radiation subsystem 110 and the detector array 116. Preferably, the distance from the collimator 306 and the detector array 116 is sufficient to allow the transportation system 130 to move a cargo container 131 between the collimator 306 and the detector array 116 in a direction perpendicular to the plane of the high-energy X-ray beam 112. The collimator 306 comprises a plate having an aperture 307 oriented such that it is struck by the high energy X-ray beam 112 with multiple energy spectra emitted by the radiation subsystem 110. In the exemplary embodiment of the present invention, the aperture 307 resembles a thin, elongate rectangle or slit used to shape the high energy X-ray beam 112 with multiple energy spectra into a fan-shaped beam. One skilled in the art will recognize that collimators 306 are often manufactured from lead and, thus, effectively block or reflect electron beams, except where desired (i.e., at the aperture 307 of the collimator 306).

The transportation system 130 is positioned between the collimator 306 and the detector array 116. The transportation system 130 is adapted to move a cargo container 131 through the high energy X-ray beam 112 with multiple energy spectra, wherein the transportation system 130 moves the cargo container 131 in a direction perpendicular to the plane of the high energy X-ray beam 112 with multiple energy spectra.

The detector array 116 (i.e., a component of the detection and signal processing subsystem 115 described above) communicatively connects to the image generation subsystem 120. The detector array 116 is positioned proximate to the transportation system 130 and substantially perpendicular to the high energy X-ray beam 112 with multiple energy spectra. The detector array 116 is adapted to detect high energy X-ray beam 112 pulses emitted by the radiation subsystem 110, to convert detected high energy X-ray beam 112 pulses into electrical charge distributions, to transform the electrical charge distributions into digital codes, signals, and/or data, and to provide the digital codes, signals, and/or data to the image generation subsystem 120.

The image generation subsystem 120 communicatively connects to the detector array 116 and the control subsystem 125. The image generation subsystem 120 is operable to receive digital codes, signals, and/or data from the detection and signal processing subsystem 115 and to receive control signals from the control subsystem 125 for controlling operation of the image generation subsystem 120. Additionally, the image generation subsystem 120 is adapted to provide image data to the control subsystem 125 for displaying to an operator.

The control subsystem 125 is communicatively connected to the radiation subsystem 110 and the image generation subsystem 120. The control subsystem 125 is operable to generate control signals for controlling the generation of a high energy X-ray beam 112 and the generation of images from digital data. Also, the control subsystem 125 is adapted to provide appropriate control signals to the radiation subsystem 110 and the image generation subsystem 120. The control subsystem 125 provides a user interface to an operator for monitoring and controlling the radiation subsystem 110 and the image generation subsystem 120. Further, the control subsystem 125 is adapted to receive data from the image generation subsystem 120 for displaying images on a display for an operator and for determining the atomic numbers of the materials within the cargo container 131.

In operation, the radiation subsystem 110 is activated by the control subsystem 125. Once activated, the radiation subsystem 110 generates a pulsed high energy X-ray beam 112 having pulses with multiple energy spectra and directs the beam at the collimator 306. As the high energy X-ray beam 112 passes through the collimator's aperture 307, a fan-shaped beam is created and directed toward the cargo container 131 on the transportation subsystem 130. The high energy X-rays 112 pass through the cargo container 131 and are detected by the detector array 116. The high energy X-rays 112 received by the detection array 116 are converted into digital codes, signals, and/or data and are communicated to the image generation subsystem 120. The image generation subsystem 120 uses the digital codes, signals, and/or code to create an image representing the objects in the cargo container 131. The image and associated data is communicated to the control subsystem 125 for display to an operator or for discrimination of the materials within the cargo container 131.

It should be understood that while the present invention has been described with respect to determining the materials present in a cargo container 131, the scope of the present invention comprises use of the apparatuses and methods thereof to determine the materials of objects in general. It should be further understood that the scope of the present invention comprises the generation of a high energy X-ray beam 112 having pulses of X-rays with two or more different energy spectra.

Whereas the present invention has been described in detail above with respect to an embodiment thereof, it is understood that variations and modifications can be effected within the spirit and scope of the invention, as described herein before and as defined in the appended claims. The corresponding structures, materials, acts, and equivalents of all means-plus-function elements, if any, in the claims below are intended to include any structure, material, or acts for performing the functions in combination with other claimed elements as specifically claimed.

What is claimed is:

1. An apparatus for generating a high energy X-ray beam with spectra used for discriminating materials within a cargo container, the apparatus comprising:

an injector modulator adapted to produce a first voltage pulse with a first amplitude and a second voltage pulse with a second amplitude;

an injector adapted to generate an electron beam having an injection current amplitude from said first voltage pulse or said second voltage pulse;

at least two master generators adapted to produce a first stream of pulses of RF waves with a first frequency and a second stream of pulses of RF waves with a second frequency;

a commutator adapted to designate said first stream of pulses of RF waves or said second stream of pulses of RF waves as a designated stream of pulses of RF waves;

an exciter adapted to multiply frequency of said designated stream of pulses of RF waves and to amplify said designated stream of pulses of RF waves;

an amplifier adapted to amplify said designated pulses of RF waves;

an accelerating section adapted to generate and accelerate an electron beam pulse from said electron beam and said designated pulses of RF waves;

an amplifier modulator adapted to control said amplifier on when to provide said designated pulses of RF waves to said accelerating section;

a conversion target adapted to convert said accelerated electron beam pulse to a high energy X-ray beam with spectra; and a synchronizer adapted to control said injector modulator and amplifier modulator to ensure that said accelerating section receives said first stream of pulses of RF waves as said designated stream of pulses of RF waves and said electron beam generated from said first voltage pulse or said second stream of pulses of RF waves as said designated stream of pulses of RF waves and said electron beam generated from said second voltage pulse.

2. A method for generating a high energy X-ray beam with spectra used in discriminating materials in a cargo container, the method comprising the steps of:

(a) generating a first voltage pulse with a first amplitude and a second voltage pulse with a second amplitude;

(b) generating an electron beam having an injection current amplitude from said first voltage pulse or said second voltage pulse;

(c) generating a first stream of pulses of RF waves having a first frequency and a second stream of pulses of RF waves having a second frequency;

(d) designating said first stream of pulses of RF waves or said second stream of pulses of RF waves as a designated stream of pulses of RF waves;

(e) multiplying frequency of said designated stream of pulses of RF waves;

(f) amplifying said designated stream of pulses of RF waves;

(g) generating an electron current pulse from said electron beam and said designated stream of pulses of RF waves;

(h) generating a high energy X-ray beam with spectra from said electron current pulse;

(i) alternating the use of said first voltage pulse and said second voltage pulse to generate said electron beam; and (j) alternating the use of said first stream of pulses of RF waves and said second stream of pulses of RF waves as said designated stream of pulses of RF waves.

* * * * *